United States Patent [19]

Goronszy et al.

[11] Patent Number: 4,693,821

[45] Date of Patent: Sep. 15, 1987

[54] WEIR FOR WASTE WATER TREATMENT SYSTEMS

[75] Inventors: Mervyn C. Goronszy, Cremorne; Raul Olavarria, Seven Hills, both of Australia

[73] Assignee: Transfield, Inc., Irvine, Calif.

[21] Appl. No.: 779,116

[22] Filed: Sep. 23, 1985

[51] Int. Cl.$^4$ .............................................. B01D 36/04
[52] U.S. Cl. ................................ 210/241; 210/242.1; 210/525; 137/578; 137/579
[58] Field of Search ............... 210/523, 525, 527, 538, 210/540, 776, 241, 242.1, 248, 242.3; 137/577–579

[56] References Cited

U.S. PATENT DOCUMENTS

| | | | |
|---|---|---|---|
| 1,032,458 | 7/1912 | White | 210/197 |
| 1,709,783 | 4/1929 | Etheredge | 210/242.1 |
| 3,443,694 | 5/1969 | Malinovsky | 210/540 |
| 3,702,134 | 11/1972 | Henning, Jr. et al. | 210/242.3 |
| 3,774,767 | 11/1973 | Field | 210/242.1 |
| 4,010,103 | 3/1977 | Morgan et al. | 210/242.1 |
| 4,054,520 | 10/1977 | McGivern | 210/527 |
| 4,277,334 | 7/1981 | Ruidisch | 210/242.1 |
| 4,290,887 | 9/1981 | Brown et al. | 210/242.1 |
| 4,297,887 | 11/1981 | Bucaro | 73/655 |

Primary Examiner—Richard V. Fisher
Assistant Examiner—Wanda L. Millard
Attorney, Agent, or Firm—Grant L. Hubbard

[57] ABSTRACT

An improved weir for removal of liquid from wastewater systems which is positively driven and which decants wastewater only over a leading edge of an elongated weir and removes the water through downcomers is disclosed.

2 Claims, 1 Drawing Figure

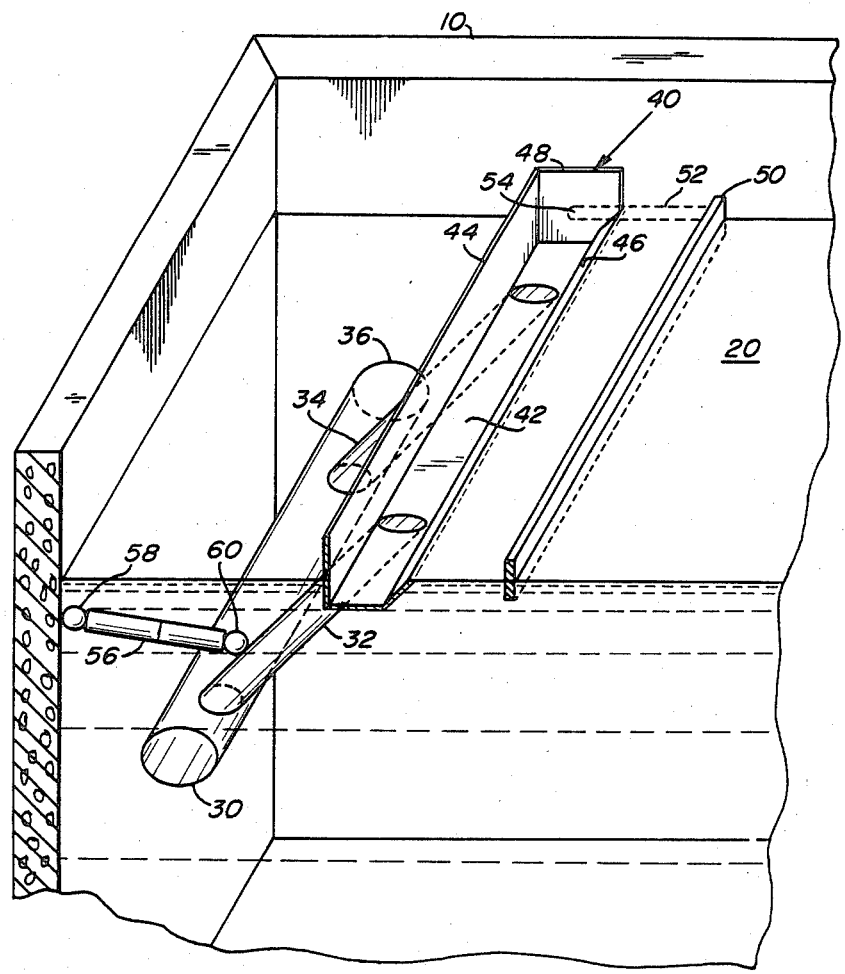

WEIR FOR WASTE WATER TREATMENT SYSTEMS

FIELD OF THE INVENTION

This invention relates to systems and methods for treating sewage and other wastewater.

BACKGROUND

It is well-known in the art to provide weirs which move with the level of a body of water to selectively remove upper layers of water. Exemplary of the ordinary and common type of weir is that shown by Brown and Jones in U.S. Pat. No. 4,290,887, Sept. 22, 1981. It is ordinary practice to provide floats for the weir, as described by Brown et al, supra.

It is an object of this invention to provide a weir which is moved positively and wherein inflow to the weir is always on one side, the inflow or leading side of the weir.

SUMMARY OF THE INVENTION

The invention comprises in combination a weir having a lead and a trailing edge, at least one downcomer liquid conduit in fluid communication with and supporting the weir, a rotatable liquid removal conduit secured in fluid communication with and supporting the weir, and means for moving the weir in a general upward and downward motion. The invention may also include a scum barrier.

BRIEF DESCRIPTION OF THE DRAWING

The sole FIGURE depicts, in partial schematic and in partial cut-away and cross-section, in perspective, the weir system of the invention in a wastewater tank.

DESCRIPTION OF THE PREFERRED EMBODIMENT

The single FIGURE shows a tank 10 and a body of wastewater 20 in which the weir assembly is used. A pipe, forming a liquid conduit 30, is rotatably mounted by journals, one of which is generally indicated at 36 in the wall of the tank, or by any other means in the tank 10. One or more downcomer liquid conduits 32 and 34 are in liquid communication with the liquid conduit 30 and support a weir 40 which includes a bottom plate 42 which is secured in liquid communication with and supported by the downcomers 32 and 34, a trailing edge 44, a leading edge 46, and ends, one of which is shown at 48. The weir may be of any construction, configuration or form so long as it performs the function described herein, the embodiment of the FIGURE being merely exemplary.

Optionally, but usually desirably, a scum barrier, typically simply a wooden or other floatable member, 50 is supported for movement relative to the weir by, for example, an arm 52 pivotally mounted as shown at 54 on the end 48 of the weir. Any kind of barrier and any mounting may be used. The mounting permits the scum barrier to move relative to the weir and the weir and mounting means therefor are so constructed and configured that the scum provides little or no bouyant support for the weir.

The weir, rather than being bouyantly supported, is positively driven in a generally upward and downward movement. Typically, the movement will be in an arc the center of which is the pipe 30; however, any upward-downward movement may be used. Any means, such as a crank on the pipe, an air or hydraulic ram, e.g. the ram 56 secured at 58 and 60 respectively to the wall and the downcomer may be used.

In operation, in the exemplary embodiment, the weir is maintained at or above the top water level in the tank. When it is desired to decant liquid from the tank, the weir is forced to move downwardly at any desired rate. During downward movement, liquid flows only over the leading edge 46 into the weir 40, through one or more downcomer pipes 32 and 34, into the supporting pipe 30 which is rotating during movement and out to the next stage or to disposal. When the level of the water is at the desired bottom water level, the weir is moved up to its starting position. The weir is so constructed and configured that liquid flow is always over the leading edge. The scum guard 50 prevents floating film, particles, etc. from entering the weir during the decant period.

It will be apparent that a number of variations may be made within the scope of this invention.

INDUSTRIAL APPLICATION

This invention finds application in the wastewater treatment industry.

What is claimed is:

1. A weir system for decanting the upper layers of wastewater from a wastewater tank to selectively lower the water level in the tank, comprising, in combination:
   (a) a rotatably mounted header pipe extending horizontally across the wastewater tank adjacent an end of the wastewater tank below the water level in the tank for withdrawing wastewater from the tank, said pipe forming a plurality of openings through the wall thereof;
   (b) an elongate weir extending horizontally across the wastewater tank, the weir comprising a bottom forming a plurality of outlet openings therethrough, a trailing side proximate said end of the tank forming an upper trailing edge, a leading side distal of said end of the tank forming a leading edge proximate the body of wastewater in the tank, and ends closing the weir, said bottom, sides and ends defining a trough-like weir structure;
   (c) a plurality of downcomer pipes extending between the weir and the header pipe and connected to said plurality of outlet openings therein providing closed fluid communication between the weir and the header pipe through said plurality of outlet openings therein, for permitting flow into the header pipe only from the weir; and
   (d) positive drive means associated with the tank for selectively rotating the header pipe thereby moving the weir in an arcuate path, respectively downwardly to lower the level of wastewater in the tank and upwardly to permit the tank to fill with wastewater, the weir being so constructed and disposed that the leading edge thereof is always lower than the trailing edge thereof thus permitting wastewater to flow into the weir only over the leading edge thereof.

2. The weir system of claim 1 further comprising a floating scum guard proximate the leading edge of the weir and distal from said end of the tank, and means pivotally mounting the scum guard to permit the scum guard to float at substantially the same level as the level of the leading edge of the weir.

* * * * *